United States Patent
Kanamarlapudi et al.

(10) Patent No.: US 9,699,827 B2
(45) Date of Patent: Jul. 4, 2017

(54) TRANSMITTING DATA OUTSIDE OF A DISCONTINUOUS TRANSMIT (DTX) CYCLE IN WIRELESS COMMUNICATIONS

(71) Applicant: QUALCOMM Incorporated, San Diego, CA (US)

(72) Inventors: Sitaramanjaneyulu Kanamarlapudi, San Diego, CA (US); Chetan Gopalakrishnan Chakravarthy, San Diego, CA (US); Arvindhan Kumar, San Diego, CA (US); Luna Sapna D'Souza, San Diego, CA (US); Tejas Pravin Sathe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 111 days.

(21) Appl. No.: 14/507,358

(22) Filed: Oct. 6, 2014

(65) Prior Publication Data

US 2015/0312959 A1    Oct. 29, 2015

Related U.S. Application Data

(60) Provisional application No. 61/983,867, filed on Apr. 24, 2014.

(51) Int. Cl.
*H04W 76/04*    (2009.01)
*H04L 1/18*    (2006.01)

(52) U.S. Cl.
CPC ......... *H04W 76/048* (2013.01); *H04L 1/1874* (2013.01); *H04L 1/1887* (2013.01); *H04L 1/1896* (2013.01); *H04L 1/1812* (2013.01)

(58) Field of Classification Search
CPC .................................................... H04W 76/048
USPC ........................................................... 370/329
See application file for complete search history.

(56) References Cited

U.S. PATENT DOCUMENTS

| | | | | |
|---|---|---|---|---|
| 2008/0259833 A1* | 10/2008 | Ozturk | ................. | H04L 1/0007 370/310 |
| 2010/0165835 A1* | 7/2010 | Hsu | ..................... | H04W 76/027 370/225 |
| 2011/0085493 A1* | 4/2011 | Chang | .................. | H04L 1/0038 370/328 |

OTHER PUBLICATIONS

International Search Report and Written Opinion issued in International Patent Application No. PCT/US2015/024088 dated Jul. 20, 2015.

* cited by examiner

*Primary Examiner* — Shaq Taha
*Assistant Examiner* — Pamit Kaur
(74) *Attorney, Agent, or Firm* — Arent Fox LLP

(57) ABSTRACT

Aspects described herein relate to transmitting hybrid automatic repeat/request (HARQ) data in continuous packet connectivity (CPC) mode. Data is transmitted to a network according to a discontinuous transmit (DTX) cycle in a CPC mode. The CPC mode can be exited, however, based at least in part on detecting available HARQ data for transmission. In this regard, a next transmission opportunity configured for transmitting the available HARQ data is determined, where the next transmission opportunity is not within a transmission time instance defined by the DTX cycle, and the available HARQ data is transmitted during the next transmission opportunity outside of the CPC mode.

20 Claims, 7 Drawing Sheets

TRANSMITTING DATA OUTSIDE OF A DISCONTINUOUS TRANSMIT (DTX) CYCLE IN WIRELESS COMMUNICATIONS

CLAIM OF PRIORITY UNDER 35 U.S.C. §119

The present application for patent claims priority to Provisional Application No. 61/983,867 entitled "APPARATUS AND METHOD FOR TRANSMITTING DATA OUTSIDE OF A DISCONTINUOUS TRANSMIT CYCLE" filed Apr. 24, 2014, which is assigned to the assignee hereof and hereby expressly incorporated by reference herein.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In some systems, devices can be configured in a continuous packet connectivity (CPC) mode to facilitate discontinuous transmit (DTX) by the devices such to limit checking of data presence for transmission and starting data transmission only during specific occasions to balance load and improve power consumption at the device. In current configurations, a media access control (MAC) DTX cycle can be defined for determining the pattern of time instances for starting transmission at the device along with a MAC inactivity threshold for determining an inactivity time after which the device can transmit in a next MAC DTX cycle. In addition, a network can configure certain subframes for the device during which hybrid automatic repeat/request (HARQ) communications can be transmitted. In this regard, it is possible that the configured subframes for HARQ communications conflict with the time instances for transmission as defined by the MAC DTX cycle and/or the MAC inactivity threshold, which may result in significant or possibly indefinite delay for a HARQ transmission. This, in turn, can result in dropped calls or other undesirable device behavior due to the network not receiving certain communications that are to be sent via the HARQ transmission.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of transmitting hybrid automatic repeat/request (HARQ) data in continuous packet connectivity (CPC) mode is provided. The method includes transmitting data to a network according to a discontinuous transmit (DTX) cycle in a CPC mode, exiting the CPC mode based at least in part on detecting available HARQ data for transmission, determining a next transmission opportunity configured for transmitting the available HARQ data, where the next transmission opportunity is not within a transmission time instance defined by the DTX cycle, and transmitting the available HARQ data during the next transmission opportunity outside of the CPC mode.

In another aspect, an apparatus for transmitting HARQ data in CPC mode is provided. The apparatus includes a transmitting component configured to transmit data to a network according to a DTX cycle in a CPC mode, a CPC mode configuring component configured to exit the CPC mode based at least in part on detecting available HARQ data for transmission, and a HARQ transmission scheduling component configured to determine a next transmission opportunity configured for transmitting the available HARQ data, where the next transmission opportunity is not within a transmission time instance defined by the DTX cycle. Additionally, the transmitting component transmits the available HARQ data during the next transmission opportunity outside of the CPC mode.

In yet another aspect, an apparatus for transmitting HARQ data in continuous packet connectivity (CPC) mode is provided. The apparatus includes means for transmitting data to a network according to a discontinuous transmit (DTX) cycle in a CPC mode, means for exiting the CPC mode based at least in part on detecting available HARQ data for transmission, and means for determining a next transmission opportunity configured for transmitting the available HARQ data, where the next transmission opportunity is not within a transmission time instance defined by the DTX cycle. Additionally, the means for transmitting transmits the available HARQ data during the next transmission opportunity outside of the CPC mode.

In still a further aspect, a computer-readable medium storing computer executable code for transmitting HARQ data in CPC mode is provided. The computer executable code includes code for transmitting data to a network according to a DTX cycle in a CPC mode, code for exiting the CPC mode based at least in part on detecting available HARQ data for transmission, code for determining a next transmission opportunity configured for transmitting the available HARQ data, where the next transmission opportunity is not within a transmission time instance defined by the DTX cycle, and code for transmitting the available HARQ data during the next transmission opportunity outside of the CPC mode.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
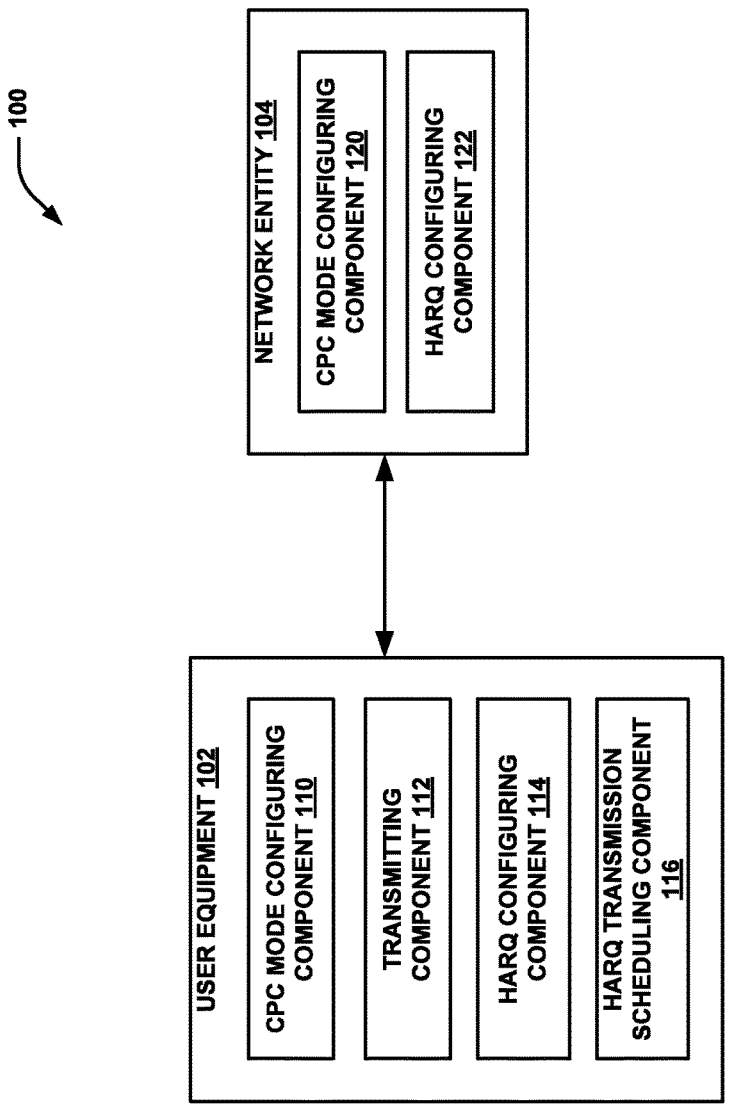
FIG. 1 is a block diagram illustrating an example wireless communications system according to the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. Moreover, in an aspect, a component may be generally understood to be one of the parts that make up a system, may be hardware or software, and/or may be divided into other components.

Described herein are various aspects for allowing transmission of certain communications outside of a continuous packet connectivity (CPC) mode to avoid substantial or potentially indefinite delay of the communications. For example, a CPC mode operating on a device may define a discontinuous transmit (DTX) cycle where the device transmits at defined transmission intervals of the DTX cycle. In an example, certain scheduled transmissions, such as hybrid automatic repeat/request (HARQ) transmissions, may be restricted to certain transmission opportunities, where the restriction can be defined by a network, higher layers of a device, etc. It is possible, however, that such transmission opportunities may conflict with transmission intervals defined by the DTX cycle at the device. In this regard, where the device has data to transmit for a scheduled transmission (such as HARQ), the device can transmit the data outside of the intervals of the DTX cycle. For example, the device may exit the CPC mode or a related process to transmit the scheduled transmission at a next opportunity defined by the schedule for the scheduled transmission. This can allow the device to avoid substantial or potentially infinite transmission delay for the scheduled transmission.

The term "CPC mode," as used herein, is generally understood to mean a mode defined for wireless communications that allows a transmitter and/or receiver to implement a sleep mode where the transmitter/receiver ceases communications for a period of time. Specifically, CPC mode is defined by UMTS communications, but the described aspects can apply to substantially any mode that allows for DTX/discontinuous receive (DRX) communications, or other communications defined by a restricted timeline.

Additionally, the term "DTX cycle," as used herein, is generally understood to mean a cycle defined by a CPC mode for transmitting communications at defined time instances, which can include a regular interval or other specification of time instance and/or may include a period of inactivity. Specifically, a DTX cycle is defined by UMTS communications in the CPC mode, but related functions described herein can apply to substantially any discontinuous communication cycle defined by a restricted timeline.

Moreover, the term "transmission opportunity," as used herein, is generally understood to mean a time instance defined in a configuration that specifies resources for transmitting data. Specifically, for example, a transmission opportunity can include a subframe specified in an HARQ configuration defined by a network entity for transmitting HARQ data to the network entity.

Figure 2:
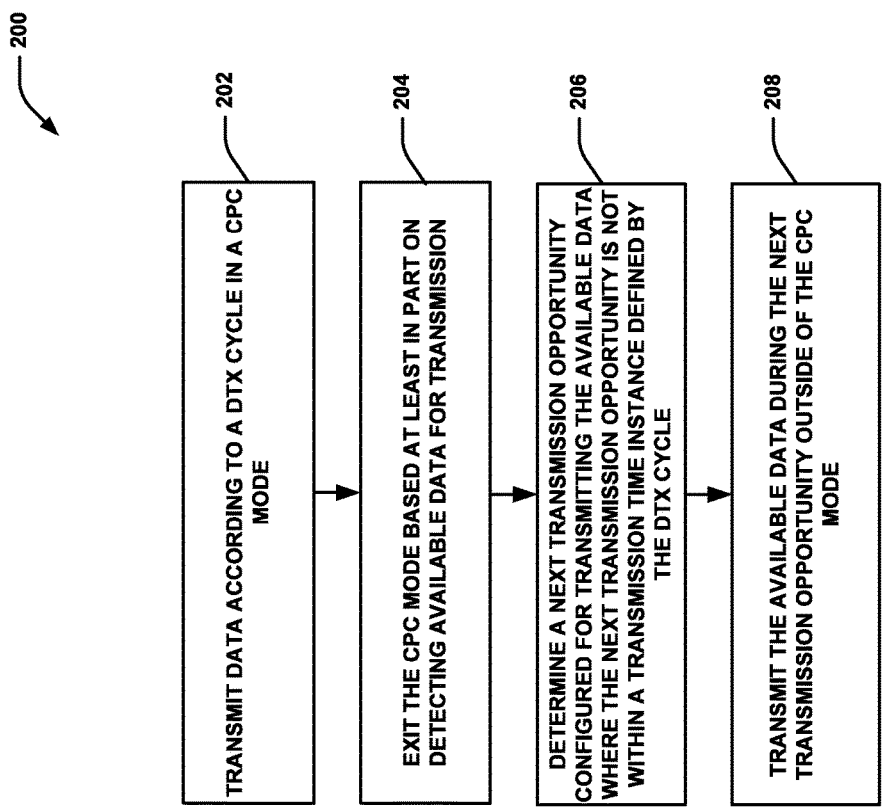
FIG. 2 is a flow diagram comprising a plurality of functional blocks representing an example methodology of the present disclosure.

Referring to FIGS. 1 and 2, aspects are depicted with reference to one or more components and one or more methods that may perform the actions or functions described herein. Although the operations described below in FIG. 2 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

FIG. 1 is a schematic diagram illustrating a system 100 for wireless communication, according to an example configuration. FIG. 1 includes a UE 102 that communicates with a network entity 104 to access a wireless network. In this regard, the network entity 104 can configure UE 102 for communicating based on a wireless network technology. For example, network entity 104 can configure a communication timeline for the UE 102 by communicating one or more resource grants to the UE 102 that can indicate time and/or frequency resources that can be used for communicating with the network entity 104. Though one UE 102 and one network entity 104 are shown, it is to be appreciated that multiple UEs 102 can communicate with a network entity 104, a UE 102 can communicate with multiple network entities 104, and/or the like.

UE 102 can include a CPC mode configuring component 110 for configuring CPC mode communications with network entity 104, a transmitting component 112 for transmitting to the network entity 104 according to the CPC mode configuration, an HARQ configuring component 114 for configuring a communication schedule for HARQ transmissions, and an HARQ transmission scheduling component 116 for scheduling HARQ transmissions for transmitting by transmitting component 112. Network entity 104 can include a CPC mode configuring component 120 for configuring CPC mode in UE 102, and an HARQ configuring component 122 for configuring HARQ in the UE 102.

UE 102 may comprise any type of mobile device, such as, but not limited to, a smartphone, cellular telephone, mobile phone, laptop computer, tablet computer, or other portable networked device that can be a standalone device, tethered to another device (e.g., a modem connected to a computer), and/or the like. In addition, UE 102 may also be referred to by those skilled in the art as a mobile station, a subscriber station, a mobile unit, a subscriber unit, a wireless unit, a remote unit, a mobile device, a mobile communications device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In addition, with the Internet of Things/Everything becoming more prevalent in the future, it would be beneficial to include other types of devices as a mobile apparatus or UE and not just the traditional mobile device, such as a watch, a personal digital assistant, a personal monitoring device, a machine monitoring device, a machine to machine communication device, etc. In general, UE 102 may be small and light enough to be considered portable and may be configured to communicate wirelessly via an over-the-air communication link using one or more OTA communication protocols described herein. Additionally, in some examples, UE 102 may be configured to facilitate communication on multiple separate networks via multiple separate subscriptions, multiple radio links, and/or the like.

Furthermore, network entity 104 may comprise one or more of any type of network module, such as an access point, a macro cell, including a base station (BS), node B, eNodeB (eNB), a relay, a peer-to-peer device, an authentication, authorization and accounting (AAA) server, a mobile switching center (MSC), a mobility management entity (MME), a radio network controller (RNC), a small cell, etc. As used herein, the term "small cell" may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a BS, an access point, a femto node, a femtocell, a pico node, a micro node, a Node B, eNB, home Node B (HNB) or home evolved Node B (HeNB). Therefore, the term "small cell," as used herein, refers to a relatively low transmit power and/or a relatively small coverage area cell as compared to a macro cell. Additionally, network entity 104 may communicate with one or more other network entities of wireless and/or core networks Additionally, system 100 may include any network type, such as, but not limited to, wide-area networks (WAN), wireless networks (e.g. 802.11 or cellular network), the Public Switched Telephone Network (PSTN) network, ad hoc networks, personal area networks (e.g. Bluetooth®) or other combinations or permutations of network protocols and network types. Such network(s) may include a single local area network (LAN) or wide-area network (WAN), or combinations of LANs or WANs, such as the Internet. Such networks may comprise a Wideband Code Division Multiple Access (W-CDMA) system, and may communicate with one or more UEs 102 according to this standard. As those skilled in the art will readily appreciate, various aspects described herein may be extended to other telecommunication systems, network architectures and communication standards. By way of example, various aspects may be extended to other Universal Mobile Telecommunications System (UMTS) systems such as Time Division Synchronous Code Division Multiple Access (TD-SCDMA), High Speed Downlink Packet Access (HSDPA), High Speed Uplink Packet Access (HSUPA), High Speed Packet Access Plus (HSPA+) and Time-Division CDMA (TD-CDMA). Various aspects may also be extended to systems employing Long Term Evolution (LTE) (in frequency division duplexing (FDD), time division duplexing (TDD), or both modes), LTE-Advanced (LTE-A) (in FDD, TDD, or both modes), CDMA2000, Evolution-Data Optimized (EV-DO), Ultra Mobile Broadband (UMB), Institute of Electrical and Electronics Engineers (IEEE) 802.11 (Wi-Fi), IEEE 802.16 (WiMAX®), IEEE 802.20, Ultra-Wideband (UWB), Bluetooth, and/or other suitable systems. The actual telecommunication standard, network architecture, and/or communication standard employed will depend on the specific application and the overall design constraints imposed on the system. The various devices coupled to the network(s) (e.g., UEs 102, network entity 104) may be coupled to a core network via one or more wired or wireless connections.

FIG. 2 illustrates a method 200 for transmitting data outside of transmission instances defined by a CPC mode. Method 200 includes, at Block 202, transmitting data according to a DTX cycle in a CPC mode. Transmitting component 112 can transmit data according to a DTX cycle in a CPC mode (e.g., to network entity 104 or other network devices). For example, CPC mode configuring component 110 can configure a CPC mode for communicating with network entity 104 (or other devices). The CPC mode may define a DTX cycle based on one or more parameters related to a transmission instance at which to transmit to network entity 104 (e.g., a time interval between transmissions, a starting time for transmission, etc.). In addition, for example, the CPC mode may include an inactivity threshold parameter that indicates a time interval during which the UE 102 is not to transmit to the network entity 104, as described herein. In one example, CPC mode configuring component 120 of network entity 104 may define and provision the parameters to UE 102, and CPC mode configuring component 110 can accordingly configure UE 102 such that transmitting component 112 transmits according to the CPC mode parameters. In other examples, CPC mode configuring component 110 may configured CPC mode based on a store configuration, an indication to access a stored configuration from network entity 104, etc. It is to be appreciated that the transmitting component 112 may include a transceiver, receiver, transmitter, a related processor, and/or the like, as described herein (e.g., transceiver 310 in FIG. 3, transmitter 732, 756, receiver 735, 754, or related processors 720, 730, 736, 738, 740, 744, 746, 760, 770, 780, 782, 790, 794, in FIG. 7, etc.).

Method 200 also includes, at Block 204, exiting the CPC mode based at least in part on detecting available data for transmission. For example, CPC mode configuring component 110 can exit the CPC mode based at least in part on detecting available data for transmission. As described, CPC mode configuring component 110 can be communicating in the CPC mode such to transmit according to the parameters that define the DTX cycle via transmitting component 112. In this regard, CPC mode configuring component 110 may detect certain data available for transmission. As described, this can include detecting scheduled transmission data, such as HARQ data, which can include determining that a buffer related to the HARQ data (e.g., a MAC-d flow) is not empty (e.g., based on verifying contents of the buffer, determining a size of the buffer as greater than zero or another threshold, etc.). In another example, detecting the available data can include determining a time that the data has been in the buffer without transmission (e.g., a time the HARQ data was inserted in the buffer subtracted from a current time) is over a threshold time, etc. When certain available data is detected, CPC mode configuring component 110 can at least temporarily exit the CPC mode, which can allow for scheduling transmission of data outside of the DTX cycle, as described further herein.

Method 200 further includes, at Block 206, determining a next transmission opportunity configured for transmitting the available data where the next transmission opportunity is not within a transmission time instance defined by the DTX cycle. HARQ transmission scheduling component 116 can determine the next transmission opportunity configured for transmitting the available data where the next transmission opportunity is not within a transmission time instance defined by the DTX cycle. For example, HARQ configuring component 114 can configure UE 102 for transmitting according to a configuration that defines transmission opportunities for transmitting the data (e.g., one or more time transmit intervals (TTI), subframes, etc.). For example, the configuration may indicate which of a plurality of subframes may be used to transmit HARQ data, and may indicate a subset of a plurality of subframes that can repeat over time (e.g., a plurality of subframes in each frame, etc.).

HARQ configuring component 114 can obtain the HARQ configuration from network entity 104, in one example, and thus network entity 104 can include an HARQ configuring component 122 (see FIG. 1) for generating and communicating a HARQ configuration to the UE 102. For example, HARQ configuring component 122 can generate the HARQ configuration to indicate the one or more transmission opportunities for transmitting HARQ data, and may do so based on one or more parameters of the UE 102, based on an uplink grant for the UE 102, based on a load balancing mechanism for HARQ data, and/or the like. In any case, the HARQ configuration can be defined independently of the DTX cycle in the CPC mode configuration (e.g., as configured by CPC mode configuring component 120 or otherwise). Thus, the HARQ configuration may conflict with the DTX cycle such that a time instance during a DTX cycle may not align with the HARQ transmission opportunities defined in the HARQ configuration. As described, depending on the CPC mode configuration and the HARQ configuration, this may occur in multiple consecutive transmit opportunities for the HARQ data and/or possibly indefinitely.

Accordingly, in an example, the available data can be transmitted outside of the CPC mode (and thus regardless of the DTX cycle). Thus, method 200 includes, at Block 208, transmitting the available data during the next transmission opportunity outside of the CPC mode. Transmitting component 112 can transmit the available data during the next transmission opportunity (e.g., defined by the HARQ configuration) and outside of the CPC mode (e.g., in a time instance not configured in the DTX cycle). This can ensure that the available data is transmitted at some point as the CPC mode configured time instances and the available data transmission opportunities may not align within a reasonable time (if ever). It is to be appreciated that, HARQ data can include retransmission of previous data as requested by the network entity 104 or other receiver of the data. Thus, where the available data corresponds to HARQ data transmitted based on a HARQ configuration, allowing the HARQ transmission scheduling component 116 to schedule HARQ transmissions outside of the DTX cycle can prevent delays in receiving the retransmitted data, which can improve efficiency of the communications, prevent dropped calls, etc. In addition, CPC mode configuring component 110 can resume the CPC mode following transmission of the available data.

In a specific example, in UMTS configurations, UE 102 can be configured in CPC mode to have improved power performance and resource utilization with some of the configuration parameters like MAC DTX Cycle and MAC Inactivity Threshold. MAC DTX cycle defines the pattern of time instances where the start the uplink enhanced dedicated channel (E-DCH) transmission after inactivity is allowed, and MAC Inactivity Threshold defines E-DCH inactivity time after which the UE can start E-DCH transmission (e.g., at the given times defined by the DTX cycle), thus transmitting data according to the DTX cycle in CPC mode as in Block 202. Radio resource control (RRC) at the network entity 104 can allocate non-scheduled transmission grants to individual MAC-d flows of one or more UEs (e.g., UE 102) in order to reduce the transmission delays. Non-scheduled transmissions are allowed on the Primary Uplink Frequency and the primary stream if uplink MIMO is configured by higher layers. For example, when a 2 ms TTI is configured by the RRC, each non-scheduled grant communicated to the UE 102 is applicable to the specific set of HARQ processes indicated by RRC. The applicability of scheduled grants can be also restricted to a specific set of HARQ processes when a 2 ms TTI is configured. HARQ process restriction and reservation can be under the control of the serving cell Node B (e.g., network entity 104) and indicated to the UE 102 by RRC layer communications (e.g., by HARQ configuring component 122), which is referred to herein also as an HARQ configuration.

In this example, in FDD, for each Activated Uplink Frequency, in case DTX is configured by higher layers and no E-DCH transmission is performed in a current TTI on that Activated Uplink Frequency, the following algorithm may be used to determine the DTX cycle:

--- if MAC Inactivity Threshold > 1 and no E-DCH transmission has been performed for MAC Inactivity Threshold − 1 previous TTIs or,
if MAC Inactivity Threshold = 1:
   E-DCH Transport Format Combination (E-TFC) selection for the time instances defined for the DTX cycle can be performed for the TTIs where the following conditions are fulfilled:
      For 2ms TTI: [5*connection frame number (CFN) + subframe number − UE DTX DRX Offset] mod MAC DTX Cycle = 0;
      For 10ms TTI:[5*CFN − UE DTX DRX Offset] mod MAC DTX Cycle = 0.

---

In the above example, UE DTX DRX Offset can indicate a shift to apply to DTX/DRX mode communications at the UE 102 and may be configured by the network entity 104 for the UE 102, as described. In 2 ms TTI case, if the TTI that fulfilled [5*CFN+subframe number−UE DTX DRX Offset] mod MAC DTX Cycle=0 overlapped with an uplink compressed mode transmission gap, the E-TFC selection can be performed for the first TTI not overlapping with an uplink compressed mode transmission gap.

Even though the concept of CPC DTX configuration parameters (MAC DTX Cycle, MAC Inactivity Threshold) in more logical sense may be, to limit the checking of data presence for transmission periodically and starting the data transmission in specific occasions to balance the load and improve the UE performance in terms of battery, these concepts may not be achievable where HARQ configuration through L3 signaling message is conflicting with the DTX cycle. For example, if the UE 102 is configured in 2 ms TTI with HARQ configuration as 1000 0001, meaning that UE 102 is allowed to transmit only on subframes HARQ 0 and HARQ 7, as per the above DTX algorithm, only certain TTIs are allowed to check for E-TFC Indicator (E-TFCI) selection. Even though E-TFCI selection is started, if the scheduled HARQ data in that enhanced uplink (EUL) subframe or TTI is not allowed, UE 102 cannot send the scheduled HARQ data. UE 102 may also have to restart the MAC Inactivity threshold in the conventional implementation.

In one specific example, this can occur given MAC Inactivity Threshold=32, MAC DTX Cycle=8, and subframes with the below HARQ allocation in UMTS. Below is an example data structure defining this example.

```
transmissionGrantType non-ScheduledTransGrantInfo :
{
    modeSpecificInfo fdd :
    {
        maxMAC-e-PDUContents 168,
        ms2-NonSchedTransmGrantHARQAlloc
        '10000001'B
    }
},
mac-dtx-Cycle-2ms sub-frames-8
},
e-dch-TTI-Length dtx-e-dch-TTI-2ms :
{
    ue-dtx-Cycle1-2ms sub-frames-4,
    ue-dtx-Cycle2-2ms sub-frames-16,
    mac-dtx-Cycle-2ms sub-frames-8
},
ue-dtx-cycle2InactivityThreshold e-dch-tti-32,
ue-dtx-cycle2DefaultSG 19,
ue-dtx-long-preamble-length slots-4,
mac-InactivityThreshold e-dch-tti-32.
```

In this example, in some of the TTIs which satisfy the equation for 2 ms, above, though data is present, data is not transmitted because the time instances defined by the HARQ configuration do not overlap the DTX cycle. RRC performance metrics as well as network implementations expect the UE 102 response for certain messages within a certain time, without which a call may be dropped. Similarly any such extended delays on data radio bearer (RB) also can result inferior performance to the application as well as result in call drop. Thus, where the UE 102 is to transmit a RB, SRB, etc., not being able to do so due to the time instances for HARQ configuration not aligning with those for the DTX cycle may result in unexpected delays in the data transmission and result in call drop. Extended delays may be limited to couple of MAC Inactivity Threshold TTIs and/or may turn into infinity based on the configuration. If extended delay turns into infinity, data may never be transmitted by transmitting component 112.

In this specific example in UMTS, considering the logical requirement of the CPC feature, when a TTI or other time instance is allowed for E-TFCI selection but not for scheduled HARQ transmission, UE 102 can, while not transmitting in the current TTI as per restriction in the HARQ configuration, avoid the CPC State machine and start checking data transfer in consecutive TTIs for the earliest TTI in which the scheduled HARQ transmission may be allowed. This can include, for example, exiting a CPC mode at the UE 102 (e.g., configured by CPC mode configuring component 110) based on detecting available HARQ data for transmission, as in Block 204, and determining the next transmission opportunity configured for transmitting the available HARQ data, at Block 206. As described, HARQ configuring component 114 can determine the earliest TTI, in this regard, which may be the next TTI defined by the HARQ configuration (e.g., according to whether resources are available in the TTI for communicating the HARQ data), and HARQ transmission scheduling component 116 can schedule transmission of HARQ data via transmitting component 112 in the earliest available TTI. In this example, UE 102 can transmit the HARQ data at the earliest allowed TTI rather checking once every MAC Inactivity Threshold frames and checking for the equation satisfying MAC DTX Cycle. This can include transmitting the available HARQ data during the next transmission opportunity configured for transmitting HARQ data outside of CPC, as in Block 208. In addition, though not shown, it is to be appreciated that once the HARQ data is transmitted (e.g., and/or no data remains in a HARQ buffer), the CPC mode can be continued such that UE 102 operates in CPC mode in transmitting to network entity 104 using the DTX cycle.

Figure 3:
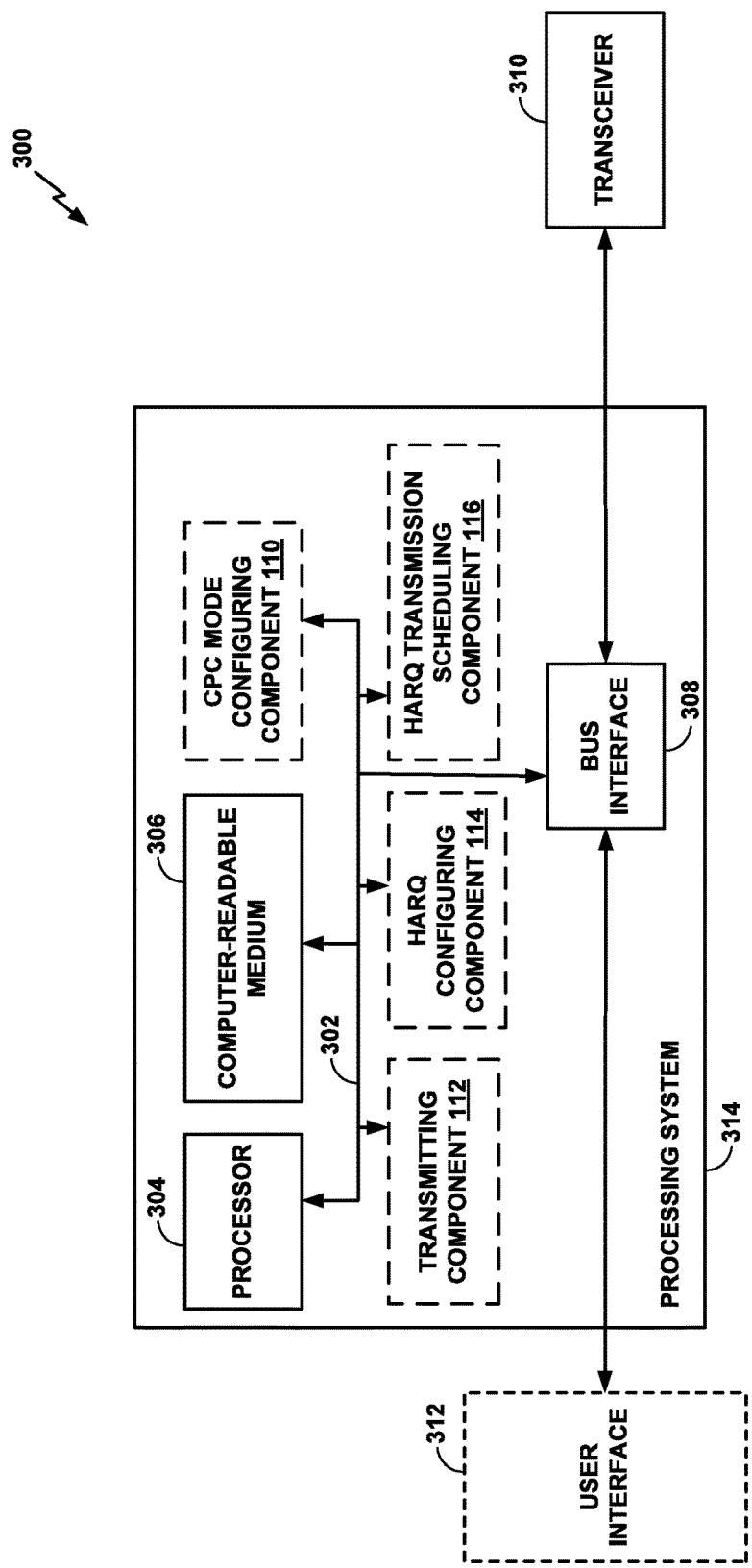
FIG. 3 is a diagram illustrating an example of a hardware implementation for an apparatus employing a processing system.

FIG. 3 is a conceptual diagram illustrating an example of a hardware implementation for an apparatus 300 employing a processing system 314. In some examples, the processing system 314 may comprise a UE, network entity, etc., or a component of a UE, network entity, etc. (e.g., UE 102 or network entity 104 of FIG. 1, etc.). In this example, the processing system 314 may be implemented with a bus architecture, represented generally by the bus 302. The bus 302 may include any number of interconnecting buses and bridges depending on the specific application of the processing system 314 and the overall design constraints. The bus 302 links together various circuits including one or more processors, represented generally by the processor 304, computer-readable media, represented generally by the computer-readable medium 306, CPC mode configuring component 110, transmitting component 112, HARQ configuring component 114, HARQ transmission scheduling component 116, etc. (see FIG. 1), which may be configured to carry out one or more methods or procedures described herein.

The bus 302 may also link various other circuits such as timing sources, peripherals, voltage regulators, and power management circuits, which are well known in the art. A bus interface 308 provides an interface between the bus 302 and a transceiver 310. The transceiver 310 provides a means for communicating with various other apparatus over a transmission medium. In an example, transceiver 310 can include or perform the functions of transmitting component 112, as described herein. Depending upon the nature of the apparatus, a user interface 312 (e.g., keypad, display, speaker, microphone, joystick) may also be provided.

The processor 304 is responsible for managing the bus 302 and general processing, including the execution of software stored on the computer-readable medium 306. The software, when executed by the processor 304, causes the processing system 314 to perform the various functions described infra for any particular apparatus. The computer-readable medium 306 may also be used for storing data that is manipulated by the processor 304 when executing software.

In an aspect, processor 304, computer-readable medium 306, or a combination of both may be configured or otherwise specially programmed to perform the functionality of the CPC mode configuring component 110, transmitting component 112, HARQ configuring component 114, HARQ transmission scheduling component 116, or various other components described herein. For example, processor 304, computer-readable medium 306, or a combination of both may be configured or otherwise specially programmed to perform the functionality of CPC mode configuring component 110, transmitting component 112, HARQ configuring component 114, HARQ transmission scheduling component 116, etc., described herein, and/or the like.

Figure 4:
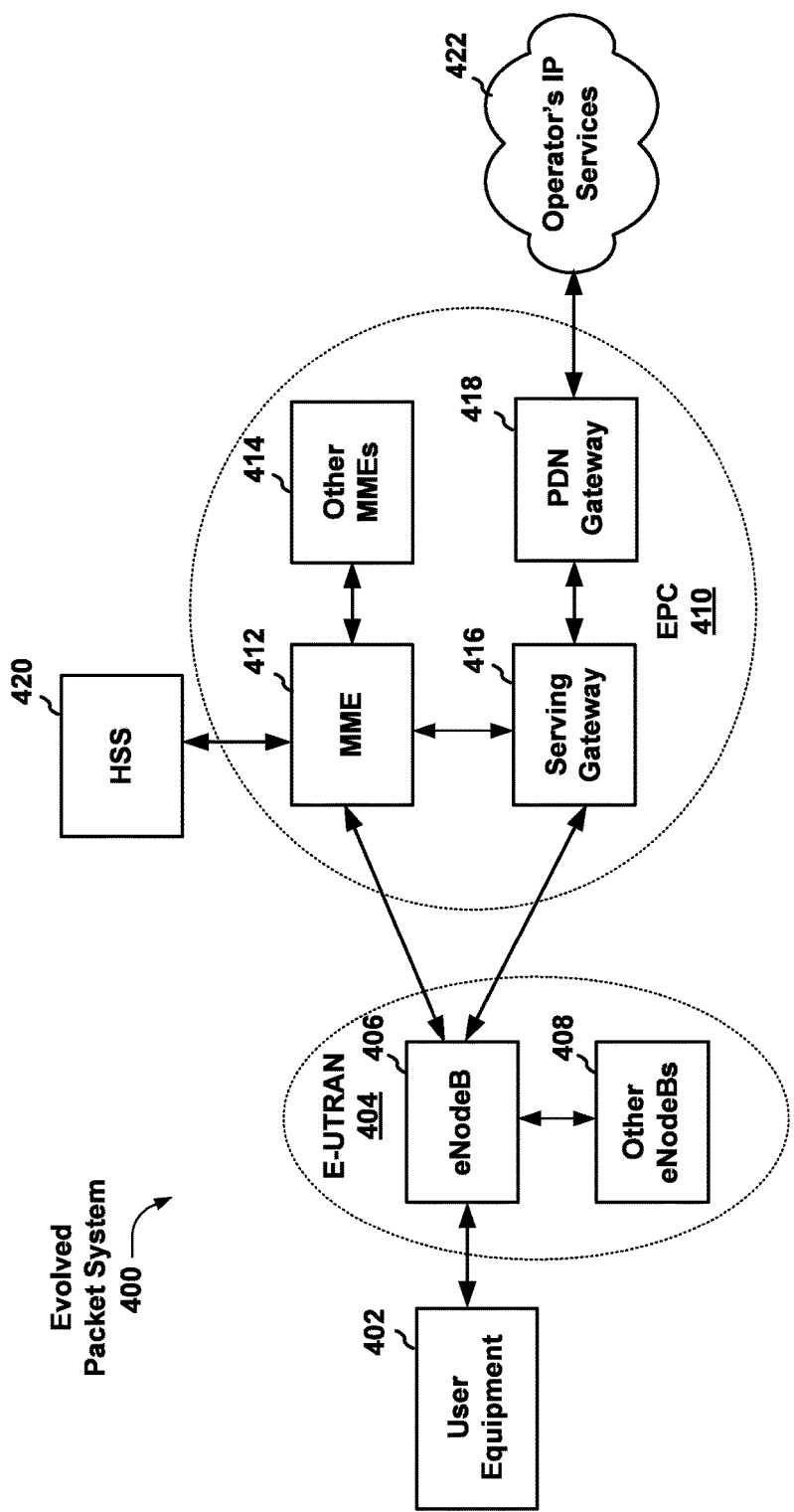
FIG. 4 is a block diagram conceptually illustrating an example of an LTE telecommunications system.

FIG. 4 is a diagram illustrating an LTE network architecture 400 employing various apparatuses (e.g., UE 102 and network entity 104 of FIG. 1). The LTE network architecture 400 may be referred to as an Evolved Packet System (EPS) 400. The EPS 400 may include one or more user equipment (UE) 402 (which may represent UE 102 of FIG. 1), an Evolved UMTS Terrestrial Radio Access Network (E-UTRAN) 404, an Evolved Packet Core (EPC) 410, a Home Subscriber Server (HSS) 420, and an Operator's IP Services 422. The EPS can interconnect with other access networks, but for simplicity those entities/interfaces are not shown. As shown, the EPS provides packet-switched services, however, as those skilled in the art will readily appreciate, the various concepts presented herein may be extended to networks providing circuit-switched services.

The E-UTRAN includes the evolved Node B (eNB) 406 and other eNBs 408, one or more of which may represent network entity 104 of FIG. 1. The eNB 406 provides user and control plane protocol terminations toward the UE 402. The eNB 406 may be connected to the other eNBs 408 via an X2 interface (i.e., backhaul). The eNB 406 may also be referred to by those skilled in the art as a base station, a base transceiver station, a radio base station, a radio transceiver, a transceiver function, a basic service set (BSS), an extended service set (ESS), or some other suitable terminology. The eNB 406 provides an access point to the EPC 410 for a UE 402. Examples of UEs 402 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 402 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 406 is connected by an S1 interface to the EPC 410. The EPC 410 includes a Mobility Management Entity (MME) 412, other MMEs 414, a Serving Gateway 416, and a Packet Data Network (PDN) Gateway 418. The MME 412 is the control node that processes the signaling between the UE 402 and the EPC 410. Generally, the MME 412 provides bearer and connection management. All user IP packets are transferred through the Serving Gateway 416, which itself is connected to the PDN Gateway 418. The PDN Gateway 418 provides UE IP address allocation as well as other functions. The PDN Gateway 418 is connected to the Operator's IP Services 422. The Operator's IP Services 422 include the Internet, the Intranet, an IP Multimedia Subsystem (IMS), and a PS Streaming Service (PSS).

Figure 5:
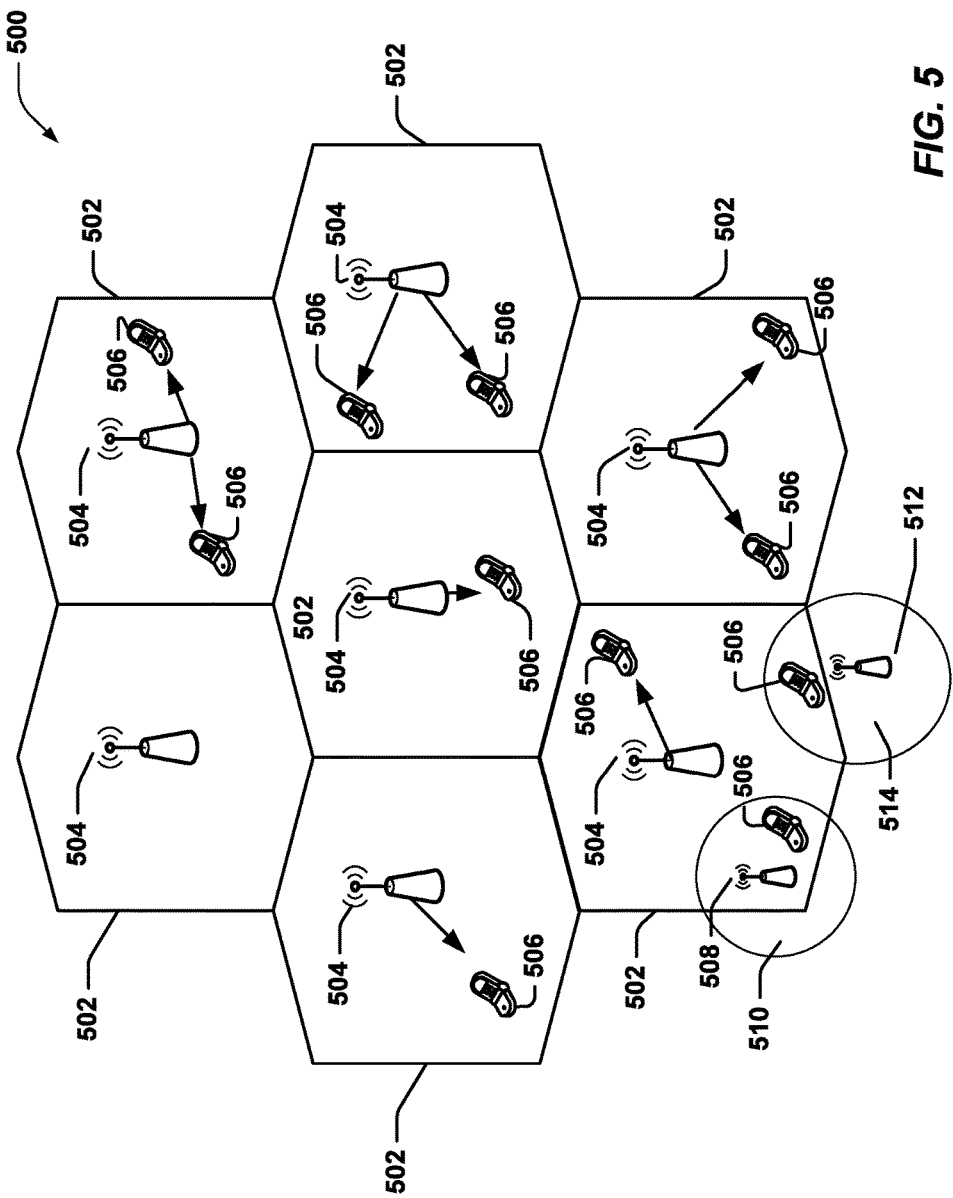
FIG. 5 is a diagram illustrating an example of an access network in an LTE network architecture.

FIG. 5 is a diagram illustrating an example of an access network in an LTE network architecture. In this example, the access network 500 is divided into a number of cellular regions (cells) 502. One or more lower power class eNBs 508, 512 may have cellular regions 510, 514, respectively, that overlap with one or more of the cells 502. The lower power class eNBs 508, 512 may be small cells (e.g., home eNBs (HeNBs)). A higher power class or macro eNB 504 is assigned to a cell 502 and is configured to provide an access point to the EPC 410 for all the UEs 506 in the cell 502. There is no centralized controller in this example of an access network 500, but a centralized controller may be used in alternative configurations. The eNB 504 is responsible for all radio related functions including radio bearer control, admission control, mobility control, scheduling, security, and connectivity to the serving gateway 416. In an aspect, one or more of the eNBs 504, 508, 512 may represent network entity 104 of FIG. 1.

The modulation and multiple access scheme employed by the access network 500 may vary depending on the particular telecommunications standard being deployed. In LTE applications, orthogonal frequency-division multiplexing (OFDM) is used on the downlink (DL) and single-carrier frequency division multiple access (SC-FDMA) is used on the uplink (UL) to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNB 504 may have multiple antennas supporting multiple-input, multiple output (MIMO) technology. The use of MIMO technology enables the eNB 504 to exploit the spatial domain to support spatial multiplexing, beamforming, and transmit diversity.

Spatial multiplexing may be used to transmit different streams of data simultaneously on the same frequency. The data steams may be transmitted to a single UE 506 to increase the data rate or to multiple UEs 506 to increase the overall system capacity. This is achieved by spatially precoding each data stream and then transmitting each spatially precoded stream through a different transmit antenna on the downlink. The spatially precoded data streams arrive at the UE(s) 506 with different spatial signatures, which enables each of the UE(s) 506 to recover the one or more data streams destined for that UE 506. On the uplink, each UE 506 transmits a spatially precoded data stream, which enables the eNB 504 to identify the source of each spatially precoded data stream. In an aspect, UE 506 may represent UE 102 of FIG. 1.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

Figure 6:
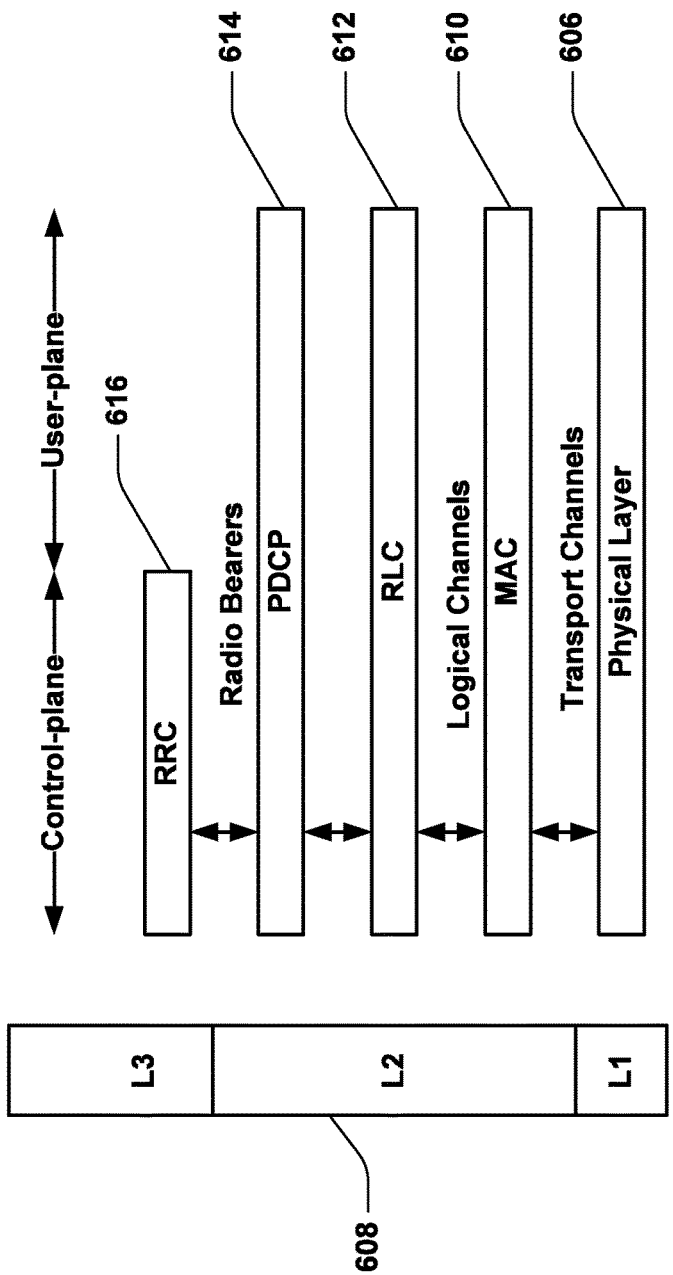
FIG. 6 is a diagram illustrating an example of a radio protocol architecture for the user and control plane.

Turning to FIG. 6, the radio protocol architecture for a UE (e.g., UE 102 of FIG. 1) and an eNB (e.g., network entity 104 of FIG. 1) is shown with three layers: Layer 1, Layer 2, and Layer 3. Layer 1 is the lowest layer and implements various physical layer signal processing functions. Layer 1 will be referred to herein as the physical layer 606. Layer 2 (L2 layer) 608 is above the physical layer 606 and is responsible for the link between the UE and eNB over the physical layer 606.

In the user plane, the L2 layer 608 includes a media access control (MAC) sublayer 610, a radio link control (RLC) sublayer 612, and a packet data convergence protocol (PDCP) 614 sublayer, which are terminated at the eNB on the network side. Although not shown, the UE may have several upper layers above the L2 layer 608 including a network layer (e.g., IP layer) that is terminated at the PDN gateway 418 (see FIG. 4) on the network side, and an application layer that is terminated at the other end of the connection (e.g., far end UE, server, etc.).

The PDCP sublayer 614 provides multiplexing between different radio bearers and logical channels. The PDCP sublayer 614 also provides header compression for upper layer data packets to reduce radio transmission overhead, security by ciphering the data packets, and handover support for UEs between eNBs. The RLC sublayer 612 provides segmentation and reassembly of upper layer data packets, retransmission of lost data packets, and reordering of data packets to compensate for out-of-order reception due to hybrid automatic repeat request (HARQ). The MAC sublayer 610 provides multiplexing between logical and transport channels. The MAC sublayer 610 is also responsible for allocating the various radio resources (e.g., resource blocks) in one cell among the UEs. The MAC sublayer 610 is also responsible for HARQ operations.

In the control plane, the radio protocol architecture for the UE and eNB is substantially the same for the physical layer 606 and the L2 layer 608 with the exception that there is no header compression function for the control plane. The control plane also includes a radio resource control (RRC) sublayer 616 in Layer 3. The RRC sublayer 616 is responsible for obtaining radio resources (i.e., radio bearers) and for configuring the lower layers using RRC signaling between the eNB and the UE.

Figure 7:
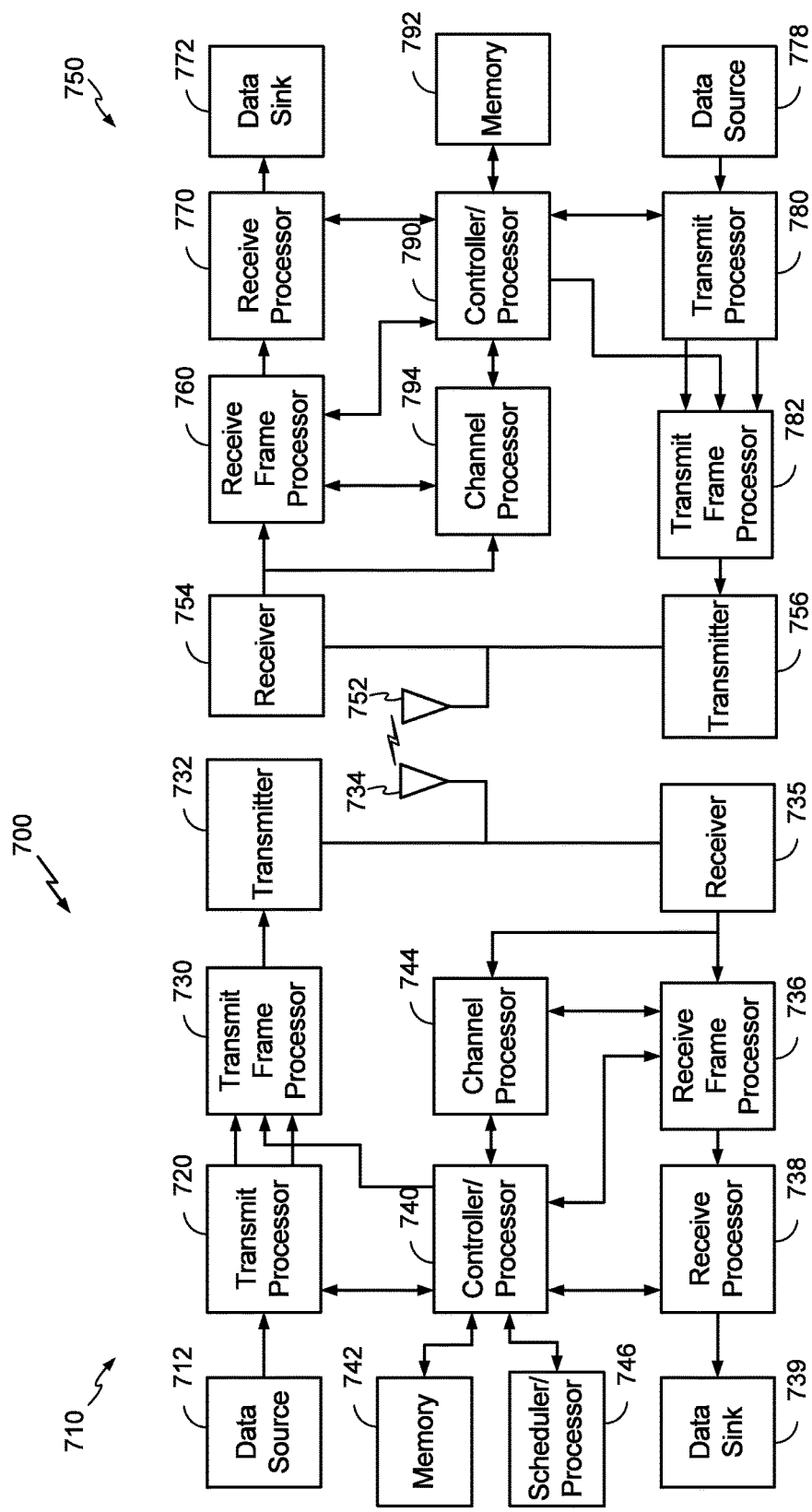
FIG. 7 is a diagram illustrating an example of an evolved Node B and user equipment in an access network.

Referring to FIG. 7, an aspect of a Node B 710 in communication with a UE 750, where the Node B 710 may network entity 104 in FIG. 1, and UE 750 may be UE 102 executing functions and/or components thereof as described in FIG. 1. In the downlink communication, a transmit processor 720 may receive data from a data source 712 and control signals from a controller/processor 740. The transmit processor 720 provides various signal processing functions for the data and control signals, as well as reference signals (e.g., pilot signals). For example, the transmit processor 720 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 744 may be used by a controller/processor 740 to determine the coding, modulation, spreading, and/or scrambling schemes for the transmit processor 720. These channel estimates may be derived from a reference signal transmitted by the UE 750 or from feedback from the UE 750. The symbols generated by the transmit processor 720 are provided to a transmit frame processor 730 to create a frame structure. The transmit frame processor 730 creates this frame structure by multiplexing the symbols with information from the controller/processor 740, resulting in a series of frames. The frames are then provided to a transmitter 732, which provides various signal conditioning functions including amplifying, filtering, and modulating the frames onto a carrier for downlink transmission over the wireless medium through antenna 734. The antenna 734 may include one or more antennas, for example, including beam steering bidirectional adaptive antenna arrays or other similar beam technologies.

At the UE 750, a receiver 754 receives the downlink transmission through an antenna 752 and processes the transmission to recover the information modulated onto the carrier. The information recovered by the receiver 754 is provided to a receive frame processor 760, which parses each frame, and provides information from the frames to a channel processor 794 and the data, control, and reference signals to a receive processor 770. The receive processor 770 then performs the inverse of the processing performed by the transmit processor 720 in the Node B 710. More specifically, the receive processor 770 descrambles and despreads the symbols, and then determines the most likely signal constellation points transmitted by the Node B 710 based on the modulation scheme. These soft decisions may be based on channel estimates computed by the channel processor 794. The soft decisions are then decoded and deinterleaved to recover the data, control, and reference signals. The CRC codes are then checked to determine whether the frames were successfully decoded. The data carried by the successfully decoded frames will then be provided to a data sink 772, which represents applications running in the UE 750 and/or various user interfaces (e.g., display). Control signals carried by successfully decoded frames will be provided to a controller/processor 790. When frames are unsuccessfully decoded by the receiver processor 770, the controller/processor 790 may also use an acknowledgement (ACK) and/or negative acknowledgement (NACK) protocol to support retransmission requests for those frames.

In the uplink, data from a data source 778 and control signals from the controller/processor 790 are provided to a transmit processor 780. The data source 778 may represent applications running in the UE 750 and various user interfaces (e.g., keyboard). Similar to the functionality described in connection with the downlink transmission by the Node B 710, the transmit processor 780 provides various signal processing functions including CRC codes, coding and interleaving to facilitate FEC, mapping to signal constellations, spreading with OVSFs, and scrambling to produce a series of symbols. Channel estimates, derived by the channel processor 794 from a reference signal transmitted by the Node B 710 or from feedback contained in the midamble transmitted by the Node B 710, may be used to select the appropriate coding, modulation, spreading, and/or scrambling schemes. The symbols produced by the transmit processor 780 will be provided to a transmit frame processor 782 to create a frame structure. The transmit frame processor 782 creates this frame structure by multiplexing the symbols with information from the controller/processor 790, resulting in a series of frames. The frames are then provided to a transmitter 756, which provides various signal conditioning functions including amplification, filtering, and modulating the frames onto a carrier for uplink transmission over the wireless medium through the antenna 752.

The uplink transmission is processed at the Node B 710 in a manner similar to that described in connection with the receiver function at the UE 750. A receiver 735 receives the uplink transmission through the antenna 734 and processes the transmission to recover the information modulated onto the carrier. The information recovered by the receiver 735 is provided to a receive frame processor 736, which parses each frame, and provides information from the frames to the channel processor 744 and the data, control, and reference signals to a receive processor 738. The receive processor 738 performs the inverse of the processing performed by the transmit processor 780 in the UE 750. The data and control signals carried by the successfully decoded frames may then be provided to a data sink 739 and the controller/processor, respectively. If some of the frames were unsuccessfully decoded by the receive processor, the controller/processor 740 may also use an acknowledgement (ACK) and/or negative acknowledgement (NACK) protocol to support retransmission requests for those frames.

The controller/processors 740 and 790 may be used to direct the operation at the Node B 710 and the UE 750, respectively. For example, the controller/processors 740 and 790 may provide various functions including timing, peripheral interfaces, voltage regulation, power management, and other control functions. In addition, for example, controller/processors 740 may include one or more components described of the UE 102 and/or network entity 104 in FIG. 1 and/or can perform the related functions thereof, as described herein. The computer readable media of memories 742 and 792 may store data and software for the Node B 710 and the UE 750, respectively (e.g. to perform the functions described herein with respect to UE 102, network entity 104, and/or their related components). A scheduler/processor 746 at the Node B 710 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects described herein may be extended to other UMTS systems such as W-CDMA, TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects described herein, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described herein. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the functionality described herein depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods or methodologies described herein may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f), or pre-AIA 35 U.S.C. §112, sixth paragraph, unless the element is expressly recited using the phrase "means for" or, in the case of a method claim, the element is recited using the phrase "step for."

What is claimed is:

1. A method of transmitting hybrid automatic repeat/request (HARQ) data in continuous packet connectivity (CPC) mode, comprising:
   transmitting data to a network according to a discontinuous transmit (DTX) cycle in a CPC mode;
   exiting the CPC mode based at least in part on detecting available HARQ data scheduled for transmission according to a HARQ configuration that indicates one or more transmission opportunities for transmitting HARQ data independent of the DTX cycle;
   determining a next transmission opportunity of the one or more transmission opportunities configured for transmitting the available HARQ data, where the next transmission opportunity is not within a transmission time instance defined by the DTX cycle; and
   transmitting the available HARQ data during the next transmission opportunity outside of the CPC mode.

2. The method of claim 1, further comprising receiving a HARQ configuration that indicates one or more subframes for transmitting HARQ communications, wherein determining the next transmission opportunity configured for transmitting the HARQ data is based at least in part on the one or more subframes in the HARQ configuration.

3. The method of claim 1, wherein determining the next transmission opportunity for transmitting the available HARQ data is based at least in part on detecting the available HARQ data for transmission.

4. The method of claim 3, wherein detecting the available HARQ data is based at least in part on detecting contents or size of a HARQ buffer.

5. The method of claim 1, further comprising resuming the CPC mode based on transmission of the available HARQ data.

6. An apparatus for transmitting hybrid automatic repeat/request (HARQ) data in continuous packet connectivity (CPC) mode, comprising:
   a transmitting component configured to transmit data to a network according to a discontinuous transmit (DTX) cycle in a CPC mode;
   a CPC mode configuring component configured to exit the CPC mode based at least in part on detecting available HARQ data scheduled for transmission according to a HARQ configuration that indicates one or more transmission opportunities for transmitting HARQ data independent of the DTX cycle; and
   a HARQ transmission scheduling component configured to determine a next transmission opportunity of the one or more transmission opportunities configured for transmitting the available HARQ data, where the next transmission opportunity is not within a transmission time instance defined by the DTX cycle,
   wherein the transmitting component transmits the available HARQ data during the next transmission opportunity outside of the CPC mode.

7. The apparatus of claim 6, further comprising a HARQ configuring component configured to receive a HARQ configuration that indicates one or more subframes for transmitting HARQ communications, wherein the HARQ transmission scheduling component determines the next transmission opportunity configured for transmitting the HARQ data based at least in part on the one or more subframes in the HARQ configuration.

8. The apparatus of claim 6, wherein the HARQ transmission scheduling component determines the next transmission opportunity for transmitting the available HARQ data based at least in part on the CPC mode configuring component detecting the available HARQ data for transmission.

9. The apparatus of claim 8, wherein the CPC mode configuring component detects the available HARQ data based at least in part on detecting contents or size of a HARQ buffer.

10. The apparatus of claim 6, wherein the CPC mode configuring component resumes the CPC mode based on transmission of the available HARQ data.

11. An apparatus for transmitting hybrid automatic repeat/request (HARQ) data in continuous packet connectivity (CPC) mode, comprising:
   means for transmitting data to a network according to a discontinuous transmit (DTX) cycle in a CPC mode;
   means for exiting the CPC mode based at least in part on detecting available HARQ data scheduled for transmission according to a HARQ configuration that indicates one or more transmission opportunities for transmitting HARQ data independent of the DTX cycle; and
   means for determining a next transmission opportunity of the one or more transmission opportunities configured for transmitting the available HARQ data, where the next transmission opportunity is not within a transmission time instance defined by the DTX cycle,
   wherein the means for transmitting transmits the available HARQ data during the next transmission opportunity outside of the CPC mode.

12. The apparatus of claim 11, further comprising means for receiving a HARQ configuration that indicates one or more subframes for transmitting HARQ communications, wherein the means for determining determines the next transmission opportunity configured for transmitting the HARQ data based at least in part on the one or more subframes in the HARQ configuration.

13. The apparatus of claim 11, wherein the means for determining determines the next transmission opportunity for transmitting the available HARQ data based at least in part on the means for exiting the CPC mode detecting the available HARQ data for transmission.

14. The apparatus of claim 13, wherein the means for exiting the CPC mode detects the available HARQ data based at least in part on detecting contents or size of a HARQ buffer.

15. The apparatus of claim 11, wherein the means for exiting the CPC mode resumes the CPC mode based on transmission of the available HARQ data.

16. A non-transitory computer-readable medium storing computer executable code for transmitting hybrid automatic repeat/request (HARQ) data in continuous packet connectivity (CPC) mode, comprising:
  code for transmitting data to a network according to a discontinuous transmit (DTX) cycle in a CPC mode;
  code for exiting the CPC mode based at least in part on detecting available HARQ data scheduled for transmission according to a HARQ configuration that indicates one or more transmission opportunities for transmitting HARQ data independent of the DTX cycle;
  code for determining a next transmission opportunity of the one or more transmission opportunities configured for transmitting the available HARQ data, where the next transmission opportunity is not within a transmission time instance defined by the DTX cycle; and
  code for transmitting the available HARQ data during the next transmission opportunity outside of the CPC mode.

17. The non-transitory computer-readable medium of claim 16, wherein the computer executable code further comprises code for receiving a HARQ configuration that indicates one or more subframes for transmitting HARQ communications, wherein the code for determining determines the next transmission opportunity configured for transmitting the HARQ data based at least in part on the one or more subframes in the HARQ configuration.

18. The non-transitory computer-readable medium of claim 16, wherein the code for determining determines the next transmission opportunity for transmitting the available HARQ data based at least in part on the means for exiting the CPC mode detecting the available HARQ data for transmission.

19. The non-transitory computer-readable medium of claim 18, wherein the code for exiting the CPC mode detects the available HARQ data based at least in part on detecting contents or size of a HARQ buffer.

20. The non-transitory computer-readable medium of claim 16, wherein the code for exiting the CPC mode resumes the CPC mode based on transmission of the available HARQ data.

* * * * *